US010465781B2

(12) United States Patent
Müller et al.

(10) Patent No.: US 10,465,781 B2
(45) Date of Patent: Nov. 5, 2019

(54) TORQUE CONVERTER CORE RING INCLUDING WRAPPED OUTER DIAMETER

(71) Applicant: Schaeffler Technologies AG & Co. KG, Herzogenaurach (DE)

(72) Inventors: Rolf Müller, Wooster, OH (US); Trent Hendershot, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 305 days.

(21) Appl. No.: 15/170,504

(22) Filed: Jun. 1, 2016

(65) Prior Publication Data
US 2017/0350487 A1 Dec. 7, 2017

(51) Int. Cl.
*F16H 41/28* (2006.01)
*F16H 41/24* (2006.01)
*F16H 45/02* (2006.01)

(52) U.S. Cl.
CPC ............ *F16H 41/28* (2013.01); *F16H 41/24* (2013.01); *F16H 45/02* (2013.01); *F16H 2045/0221* (2013.01)

(58) Field of Classification Search
CPC .......... F16H 41/28; F16H 41/24; F16H 45/02; F16H 2045/0221; F16H 2045/0205
See application file for complete search history.

(56) References Cited

U.S. PATENT DOCUMENTS

| 3,125,857 | A | * | 3/1964 | Schneider | F16H 41/26 60/361 |
| 4,783,960 | A | * | 11/1988 | Kubo | F16H 41/04 415/62 |
| 5,113,654 | A | | 5/1992 | Sahashi | |
| 6,487,855 | B1 | | 12/2002 | Yoshimoto et al. | |
| 9,841,093 | B2 | * | 12/2017 | Boigegrain | F16H 41/24 |
| 2009/0013683 | A1 | | 1/2009 | Parks et al. | |
| 2009/0113885 | A1 | | 5/2009 | Wang et al. | |

FOREIGN PATENT DOCUMENTS

WO    WO2015065806 A1    5/2015

OTHER PUBLICATIONS

Corresponding Search Report and Written Opinion for International Application PCT/US2017/034068.

* cited by examiner

*Primary Examiner* — Abiy Teka
(74) *Attorney, Agent, or Firm* — Davidson, Davidson & Kappel, LLC

(57) ABSTRACT

A core ring for an impeller or turbine of a torque converter is provided. The core ring includes an annular base portion including a convex blade side surface portion and a concave stator side surface portion and a wrapped outer diameter portion including an outwardly extending lip protruding radially outward from the annular base portion. A method of forming a torque core ring for an impeller or turbine of a torque converter is also provided. The method includes forming a wrapped outer diameter portion including an outwardly extending protrusion protruding radially outward from an annular base portion including a convex blade side surface portion and a concave stator side surface portion. A torque converter including the core ring is also provided.

11 Claims, 3 Drawing Sheets

TORQUE CONVERTER CORE RING INCLUDING WRAPPED OUTER DIAMETER

The present disclosure relates generally to torque converters and more specifically to core rings of torque converters.

BACKGROUND

Conventionally, as shown in a cross-sectional perspective view in FIG. 1, a core ring 110 of a turbine or impeller of a torque converter includes a rounded outer diameter 112 that is part of a curved blade side surface 114 of the core ring 110. At outer diameter 112, blade side surface 114 joins with an outer diameter of a radially extending edge 116, which extends perpendicular to a center axis of core ring 110. At an inner diameter thereof, blade side surface 114 joins an inner diameter edge 120, which extends axially and radially outward from the inner diameter of blade side surface 112 to join an inner diameter of a curved stator side surface 122 of core ring 110. Stator side surface 122 extends radially outward, while extending axially to a lesser degree, from curved stator side surface 122 to an inner diameter of radially extending edge 116. Core ring 110 has a constant thickness and both blade side surface 112 and stator side surface 122 follow the same curved path while extending radially outward and axially from edge 120 to edge 116. Slots 124 for receiving connecting tabs of turbine or impeller blades are formed in an interior of core ring 110, i.e., between edges 116, 120, and through core ring 110 from stator side surface 122 to blade side surface 112.

It is also known to provide undercuts 126 in radially extending edge 116, as shown in FIG. 2, extending from surface 114 to surface 122. Undercuts 126 are only for manufacturing purposes and do not have any influence on the performance of the core ring. Undercuts 126, on both sides of the carrying tab, keep the part attached to strip and providing a stretch web to let the material flow during forming. The part is pierced out in the last station of the progressive die only by cutting the carrying tabs on the outer diameter. Undercuts 126 can cause week points (stress risers) if high pressure is applied. These are the areas were failure can occur.

SUMMARY OF THE INVENTION

A core ring for an impeller or turbine of a torque converter is provided. The core ring includes an annular base portion including a convex blade side surface portion and a concave stator side surface portion and a wrapped outer diameter portion including an outwardly extending lip protruding radially outward from the annular base portion.

A torque converter is also provided. The torque converter includes a turbine; an impeller; and a stator redirecting fluid flow from the turbine back to the impeller. At least one of the turbine and the impeller includes the core ring.

BRIEF DESCRIPTION OF THE DRAWINGS

The present invention is described below by reference to the following drawings, in which.

DETAILED DESCRIPTION

A core ring is provided that includes a wrapped outer diameter. A lip formed by at the wrapped outer diameter of the core ring provides additional stiffness to the part when high pressure is applied. Providing the wrapped outer diameter allows a thinner material or a less strong material to be used for the core ring and still provide enough strength to the part to withstand the required forces in the applications. Also, the wrapped outer diameter with the outer lip is connected to the strip, using a so called onion ring cut that provides the material flow during forming. Next, the part is cut out completely so there are no undercuts required on the outer diameter. The resulting core ring thus is stiffer and does not have any stress risers on the outer diameter of the core ring that are caused by undercuts.

Figure 1:
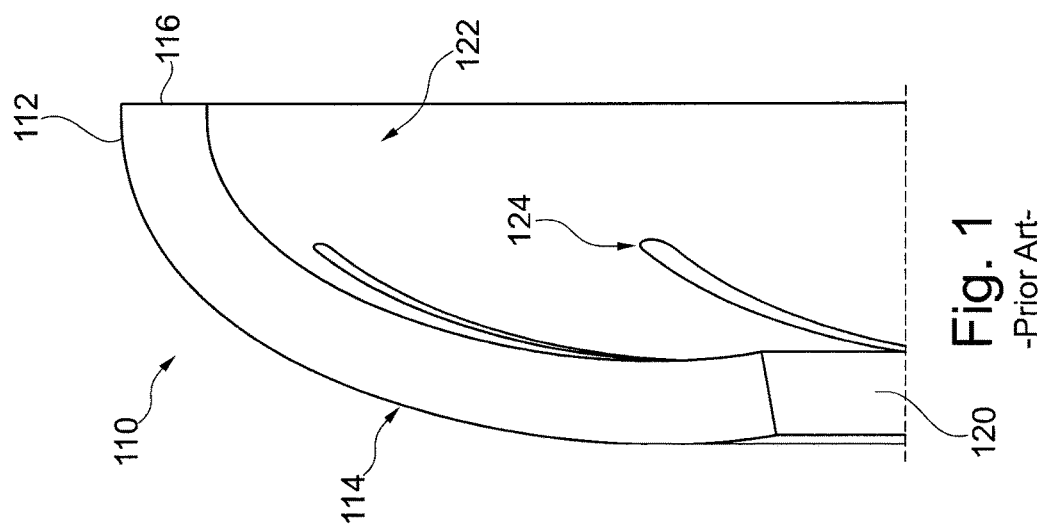
FIG. 1 shows a cross-sectional perspective view of a conventional core ring.
Figure 2:
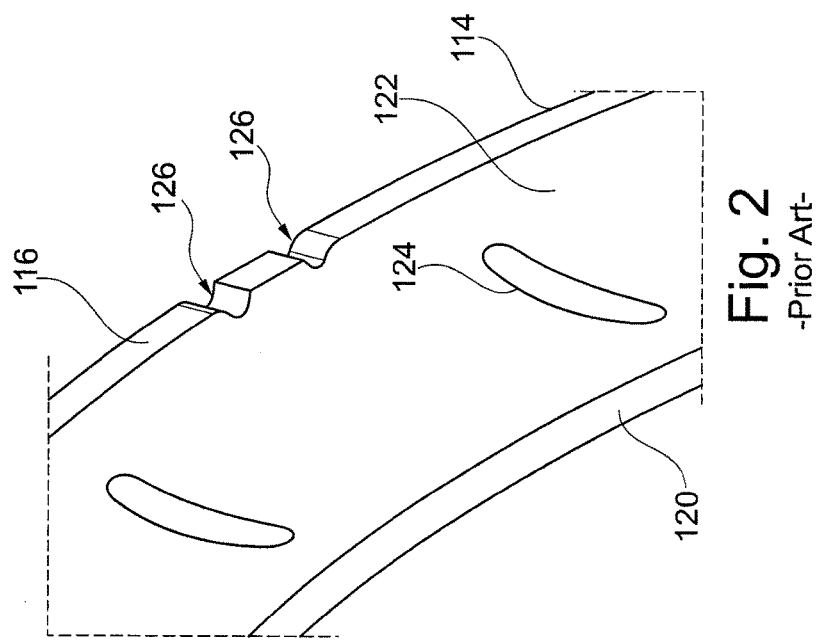
FIG. 2 shows a perspective view of another known core ring.
Figure 3:
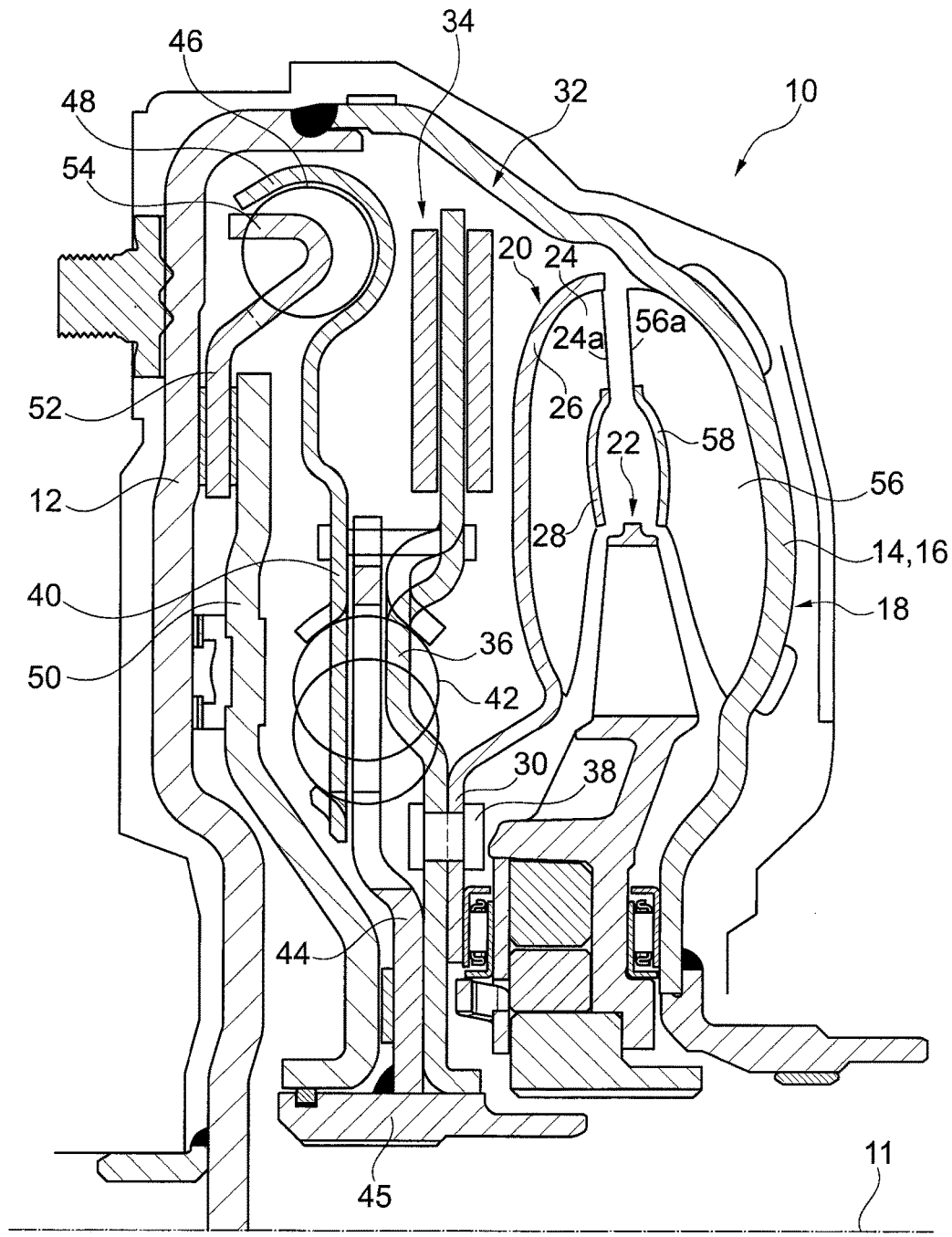
FIG. 3 shows a cross-sectional side view of a torque converter in accordance with an embodiment of the present invention.

FIG. 3 shows a cross-sectional side view of a torque converter 10 in accordance with an embodiment of the present invention. Torque converter 10 is rotatable about a center axis 11 and includes a front cover 12 for connecting to a crankshaft of an internal combustion engine and a rear cover 14 forming a shell 16 of an impeller or pump 18. The terms axially, radially and circumferentially as used herein are used with respect to center axis 11. Torque converter 10 also includes a turbine 20 opposite impeller 18 and a stator 22 axially between impeller 18 and turbine 20. Turbine 20 includes a plurality of blades 24 supported on a rounded portion of a turbine shell 26 at a rear-cover side of turbine shell 26 and supported on a core ring 28 in accordance with an embodiment of the present invention. Turbine 20 further includes an inner radial extension 30 protruding radially inward from rounded portion 26. On a front-cover side of turbine 20, turbine 20 is connected to a damper assembly 32.

Damper assembly 32 includes a CPA 34 that is formed at a radially outer end of a first cover plate 36, which is riveted to inner radial extension 30 of turbine 20 by rivets 38. Damper assembly 32 further includes a second cover plate 40 axially between first cover plate 36 and front cover 12, with cover plates 36, 40 supporting a plurality of circumferentially spaced radially inner set of springs 42 axially therebetween. Sandwiched axially between cover plates 36, 40, damper assembly 32 includes a drive flange 44 whose inner radial end is configured as a hub 45 for connecting to a transmission input shaft. Drive flange 44 includes a plurality of circumferentially extending slots formed therein for receiving springs 42. Radially outside of springs 42, damper assembly 32 further includes a plurality of circumferentially spaced radially outer set of springs 46. A radially outer end of second cover plate 40 forms a spring retainer 48 for receiving springs 46.

A piston 50 is provided between front cover 12 and damper assembly 30 and a clutch plate 52 is provided axially between piston 50 and front cover 12. Clutch plate 52, at a radially outer end thereof, includes a plurality of circumferentially spaced projections 54 for extending into the circumferential spaces formed between springs 42. Clutch plate 50, at a radially inner end thereof, is provided with a friction material on a front cover side thereof for engaging an inner axial surface of front cover 12 and a friction material on a rear cover side thereof for engaging piston 50. Piston 50, clutch plate 52 and the inner axial surface of front cover 12 form a lockup clutch for drivingly coupling turbine 20 to front cover 12 via damper assembly 30. Fluid pressure differences between a front cover side of piston 50 and a rear cover side of piston 50 control whether piston 50 engages or is disengaged from front cover 12. Cover plates 36, 40 transfer torque from turbine 20 to drive flange 44, which in turn drives the transmission input shaft. Cover plates 36, 40 together transfer torque to springs 46, which transfer torque to clutch plate 52.

Impeller 18 also includes a plurality of blades 56 supported on a rounded portion of impeller shell 16 at a front-cover side of impeller shell 16 and supported on a core ring 58 in accordance with an embodiment of the present invention.

Figure 4:
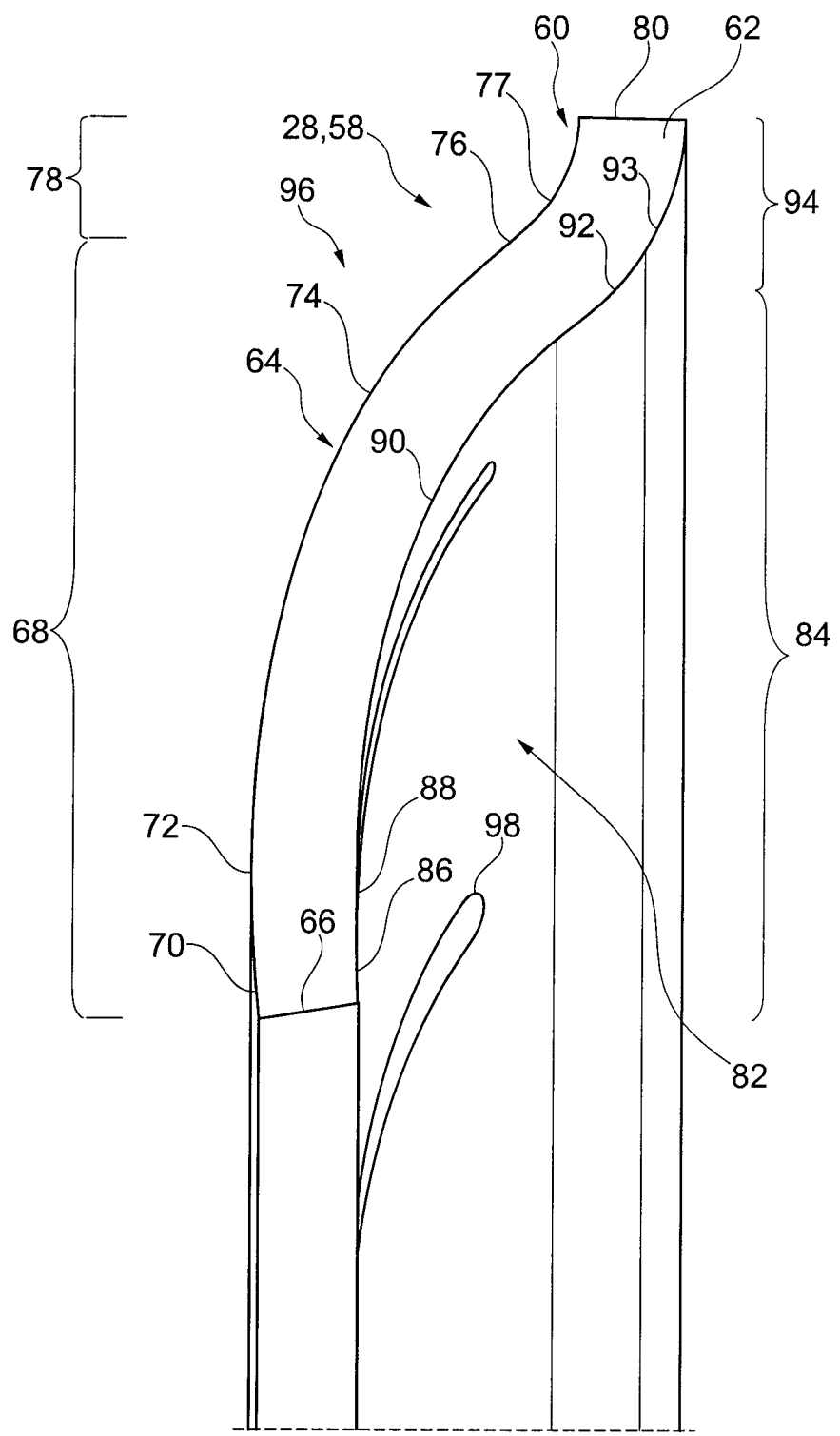
FIG. 4 shows a cross-sectional perspective view of a core ring of the torque converter shown in FIG. 3.

FIG. 4 shows a cross-sectional perspective view of core ring 28 or core ring 58 in accordance with an embodiment of the present invention. Core ring 28, 58 includes a wrapped outer diameter portion 60 including a radially outwardly extending lip 62 having an annular shape. Wrapped outer diameter portion 60 means that instead of following the arced curvature of a reminder of the core ring, the outer diameter is wrapped radially outward toward radially extending edges 24a, 56a of the respective turbine or impeller blades 24, 56 (FIG. 3). A blade side surface 64 of core ring 28, 58, at an inner diameter thereof, is joined with an inner diameter edge 66 and extends radially outward from inner diameter edge 66. Blade side surface 64 has a convex portion 68 that includes an inner curved section 70, which is contiguous with inner diameter edge 66, that curves axially away from stator 22 (FIG. 3) as it extends radially outward from inner diameter edge 66. Inner curved section 70 then, at an axial peak 72 that is a ring shaped-surface of core ring 28, 58 axially furthest from stator 22, transitions into an intermediate curved section 74 that curves axially back toward stator 22 as it extends radially outward, with inner curved section 70 and intermediate curved section 74 defining convex portion 68. At a transition section 76 forming the outer edge of intermediate section 74, blade side surface 64 transitions from convex portion 68 to an outer curved portion 77 forming a concave portion 78, which forms a blade side surface of wrapped outer diameter portion 60. Concave portion 78 curves axially toward stator 22 and joins an outer diameter edge 80, which extends axially and is parallel to center axis 11 (FIG. 3).

A stator side surface 82 of core ring 28, 58, at an inner diameter thereof, is joined with inner diameter edge 66 and extends radially outward from inner diameter edge 66. Stator side surface 82 has a concave portion 84 that includes an inner curved section 86, which is contiguous with inner diameter edge 66, that curves axially away from stator 22 (FIG. 3) as it extends radially outward from inner diameter edge 66. Inner curved section 86 then, at an axial peak 88 that is a ring shaped-surface of core ring 28, 58 axially furthest from stator 22, transitions into an intermediate curved section 90 that curves axially back toward stator 22 as it extends radially outward, with inner curved section 86 and intermediate curved section 90 defining concave portion 84. At a transition section 92 forming the outer edge of intermediate section 90, stator side surface 82 transitions from concave portion 84 to an outer curved portion 93 forming a convex portion 94, which forms a stator side surface of wrapped outer diameter portion 60. Convex portion 94 curves axially toward stator 22 and joins outer diameter edge 80. Inner diameter edge 66, convex portion 68 of blade side surface 64 and concave portion 84 of stator side surface 82 together define an annular base portion 96 of core ring 28, 58, while outer diameter edge 80, concave portion 78 of blade side surface 64 and convex portion 94 of stator side surface 82 define annular lip 62 protruding radially outward from the annular base portion 96. Core ring 28, 58 may be stamped to form annular base portion 96 and annular lip 62 simultaneously.

Blade tab receiving slots 98 for receiving connecting tabs of turbine or impeller blades are formed in an interior of base portion 96, i.e., between edge 66 and transition sections 76, 92, and extending from convex portion 68 of stator side surface 64 to concave portion 84 of blade side surface 82.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. A core ring for an impeller or turbine of a torque converter comprising:
an annular base portion including a convex blade side surface portion and a concave stator side surface portion;
a wrapped outer diameter portion including an outwardly extending lip protruding radially outward from the annular base portion, the outwardly extending lip including an outer diameter edge and a blade side outer curved surface portion extending radially outward from the convex blade side surface portion to the outer diameter edge, the blade side outer curved surface portion having a different surface curvature than the convex blade side surface portion, the outer diameter edge extending axially with respect to a center axis of the core ring about which the core ring rotates during operation; and
blade tab receiving slots extending from the convex blade side surface portion to the concave stator side surface portion; wherein the outwardly extending lip includes a stator side inner curved surface portion extending radially outward from the concave stator side surface portion to the outer diameter edge, the stator side inner curved surface portion having a different surface curvature than the concave stator side surface portion; wherein the outer diameter edge extends axially from the blade side outer curved surface portion to the stator side inner curved surface portion.

2. The core ring as recited in claim 1 wherein the blade side outer curved surface portion is concave.

3. The core ring as recited in claim 1 wherein the stator side inner curved surface portion is convex.

4. The core ring as recited in claim 1 wherein the outer diameter edge is parallel to the center axis of the core ring about which the core ring rotates during operation.

5. A torque converter comprising:
a turbine;
an impeller; and
a stator redirecting fluid flow from the turbine back to the impeller, at least one of the turbine and the impeller including the core ring as recited in claim 1.

6. A method of forming a core ring for an impeller or turbine of a torque converter comprising:
forming a wrapped outer diameter portion including an outwardly extending lip protruding radially outward from an annular base portion including a convex blade side surface portion and a concave stator side surface portion, the outwardly extending lip including an outer diameter edge and at least one of:
- a blade side outer curved surface portion extending radially outward from the convex blade side surface portion to the outer diameter edge, the blade side outer curved surface portion having a different surface curvature than the convex blade side surface portion, or
- a stator side inner curved surface portion extending radially outward from the concave stator side surface portion to the outer diameter edge, the stator side inner curved surface portion having a different surface curvature than the concave stator side surface portion, the outer diameter edge extending axially with respect to a center axis of the core ring about which the core ring rotates during operation, the core ring including blade tab receiving slots extending from the convex blade side surface portion to the concave stator side surface portion; wherein the outwardly extending lip includes the stator side inner curved surface portion extending radially outward from the concave stator side surface portion to the outer diameter edge, the stator side inner curved surface portion having a different surface curvature than the concave stator side surface portion; wherein the outer diameter edge extends axially from the blade side outer curved surface portion to the stator side inner curved surface portion.

7. The method as recited in claim 6 wherein the wrapped outer diameter portion includes both of the blade side outer curved surface portion and the stator side inner curved surface portion, the blade side outer curved surface portion being concave, the stator side inner curved surface portion being convex, the outer diameter edge extending axially from the blade side outer curved surface portion to the stator side inner curved surface portion.

8. The method as recited in claim 7 wherein the outer diameter edge is parallel to the center axis of the core ring about which the core ring rotates during operation.

9. A core ring for an impeller or turbine of a torque converter comprising:
- an annular base portion including a convex blade side surface portion and a concave stator side surface portion;
- a wrapped outer diameter portion including an outwardly extending lip protruding radially outward from the annular base portion, the outwardly extending lip including an outer diameter edge and a stator side inner curved surface portion extending radially outward from the concave stator side surface portion to the outer diameter edge, the stator side inner curved surface portion having a different surface curvature than the concave stator side surface portion, the outer diameter edge extending axially with respect to a center axis of the core ring about which the core ring rotates during operation; and
- blade tab receiving slots extending from the convex blade side surface portion to the concave stator side surface portion; where the outer diameter edge extends axially from the blade side outer curved surface portion to the stator side inner curved surface portion.

10. The core ring as recited in claim 9 wherein the stator side inner curved surface portion is convex.

11. The core ring as recited in claim 9 wherein the outwardly extending lip includes a concave blade side outer curved surface portion extending radially outward from the convex blade side surface portion to the outer diameter edge.

* * * * *